United States Patent [19] [11] 4,147,623
Koff et al. [45] Apr. 3, 1979

[54] HYDROXYLAMINE PURIFICATION VIA ION EXCLUSION

[75] Inventors: Fred W. Koff, Long Valley; Allen A. Tunick, Boonton; Stylianos Sifniades, Madison, all of N.J.

[73] Assignee: Allied Chemical Corporation, Morris Township, Morris County, N.J.

[21] Appl. No.: 846,668

[22] Filed: Oct. 28, 1977

[51] Int. Cl.$^2$ .............................................. B01D 15/04
[52] U.S. Cl. ............................. 210/31 R; 210/37 R; 210/38 R; 423/387
[58] Field of Search ................ 210/24, 30 R, 32, 34, 210/31 R, 37 R, 38 R; 423/387, 388

[56] References Cited

U.S. PATENT DOCUMENTS

| | | | |
|---|---|---|---|
| 2,684,331 | 7/1954 | Bauman | 210/24 |
| 2,771,193 | 11/1956 | Simpson et al. | 210/32 |
| 3,105,741 | 10/1963 | Moore et al. | 432/387 |
| 3,695,834 | 10/1972 | Wheelwright | 423/395 |

FOREIGN PATENT DOCUMENTS

| | | | |
|---|---|---|---|
| 1247284 | 8/1967 | Fed. Rep. of Germany | 423/387 |
| 49-14640 | 9/1974 | Japan | 423/387 |

Primary Examiner—Thomas G. Wyse
Assistant Examiner—Ivars Cintins
Attorney, Agent, or Firm—Horst M. Kasper; Robert A. Harman

[57] ABSTRACT

A process for separating hydroxylamine from an aqueous solution thereof also containing salts of cations whose corresponding free bases have base dissociation constants greater than $10^{-7}$. Said solution is brought to a pH of 6–11 and is passed through a bed of strongly ionic exchange resin loaded with compensating ions whereby hydroxylamine is retained in the gel volume of the resin bed and the ions in solution are substantially excluded from the resin. The ionic salts accordingly move faster through the bed and predominate in a first effluent fraction and the hydroxylamine appears predominantly in a later effluent fraction. Hydroxylammonium salts can be crystallized from the effluent hydroxylamine solution after addition of a stoichiometric amount of an appropriate acid.

20 Claims, No Drawings

HYDROXYLAMINE PURIFICATION VIA ION EXCLUSION

FIELD OF THE INVENTION

This invention relates to a process of separating hydroxylamine from accompanying impurities in an aqueous system.

BACKGROUND OF THE INVENTION

Hydroxylamine is prepared commercially by the Raschig process or variations thereof in which ammonium or sodium nitrite are reacted in aqueous solution with ammonium or sodium bi-sulfite and sulfur dioxide and the resulting disulfonate salts are subsequently hydrolyzed to a solution containing essentially hydroxylammonium sulfate, sulfuric acid, and ammonium or sodium sulfate plus minor amounts of the corresponding nitrates. This solution can be used, after neutralization with ammonia, as a source of hydroxylamine, e.g. for the synthesis of oximes from ketones. However, there is no simple method for isolating pure hydroxylamine or pure hydroxylammonium salts from the mixture.

One method for obtaining pure hydroxylammonium salts consists of utilizing the hydroxylammonium containing mixture to synthesize an oxime from a ketone, separating the oxime from the spent solution and hydrolyzing this oxime with a strong mineral acid to recover hydroxylammonium salt and the ketone which can be recycled. This method uses long periods of heating for the hydrolysis and requires expensive equipment for the separation of the oxime from the spent solution and of the hydroxylammonium salt from the ketone. Moreover, salts of hydroxylamine with weak or oxidizing acids cannot be prepared by this method because these acids either do not effect hydrolysis of oximes or decompose the hydroxylammonium salt formed during hydrolysis. Salts of such acids can be prepared by neutralizing cold solutions of hydroxylamine with the corresponding acid.

Heinz Holzapfel in Z. Anorg. und Allgem. Chemie, Vol. 288, page 28 (1956) describes the preparation of hydroxylamine from hydroxylammonium salts by employing an anion exchange resin in the OH form. This publication does not relate to the separation of hydroxylamine from solutions containing other cations. As disclosed in U.S. Pat. No. 3,508,864 issued Apr. 28, 1970 to Wallace T. Thompson et al., hydroxylammonium perchlorate can be produced either by liberating hydroxylamine from a hydroxylammonium salt by passage through an anion exchange resin and neutralizing with perchloric acid, or by absorbing hydroxylammonium ion on a cation exchange resin and then passing perchloric acid through the resin. This method does not separate hydroxylamine from other cations. A cation exchange method is described by Earl J. Wheelwright in Industrial Engineering Chemistry Process Design Development, Vol. 16 No. 2 (1977), page 220 for the preparation of hydroxylammonium nitrate. This method does not separate hydroxylamine from other cations and moreover the resulting solution of hydroxylammonium nitrate contains significant amounts of nitric acid.

R. M. Wheaton et al. in Ind. Eng. Chem. 45, 228 (1953) summarizes principles and applications of ion exclusion.

While the prior art describes methods for the preparation of hydroxylamine and hydroxylammonium salts, there is a need for a simple and inexpensive process for separating hydroxylamine from solutions containing salts of other cations.

SUMMARY OF THE INVENTION

We have found a process for separating hydroxylamine from aqueous solutions containing hydroxylammonium salts in mixture with salts of cations whose corresponding bases have base dissociation constants of at least $10^{-7}$. The aqueous solution is brought to a pH between about 6 and 11 and then the solution is passed through an ion exchange resin bed, loaded with charge-compensating ions which will compose a base having, in aqueous solution a base dissociation constant substantially greater than that for hydroxylamine, ($K_b = 10^{-8}$) or with charge-compensating ions which will compose an acid having an acid dissociation constant substantially greater than that for hydroxylammonium ion ($K_a = 10^{-6}$). A first effluent containing predominantly anions and cations and a later effluent containing predominantly hydroxylamine are removed from the bed thereby separating hydroxylamine from the aforesaid salts.

DETAILED DESCRIPTION OF THE INVENTION

The present invention effects the isolation of hydroxylamine from aqueous solutions containing hydroxylammonium salts in mixture with salts of other cations by means of ion exclusion. In a narrower embodiment this invention effects the isolation of hydroxylamine from aqueous solutions containing essentially hydroxylammonium sulfate, ammonium sulfate and sulfuric acid, such as are obtained by the Raschig synthesis of hydroxylamine.

We have found that the ion exclusion effect can be utilized to isolate hydroxylamine from aqueous solutions containing hydroxylamine salts in mixture with salts of cations whose corresponding bases are substantially stronger than hydroxylamine, which has a base dissociation constant, $K_b$, of about $1 \times 10^{-8}$ in aqueous solution at 20° C. The solution is brought to a pH in the range of 6–11, preferably to pH 7–9, by the addition of a base stronger than hydroxylamine. The base of preference is ammonia. Under these conditions hydroxylammonium ions are largely transformed to electrically neutral hydroxylamine ions whereas the other salts in the solution remain essentially unaffected. When the solution is passed through a bed of an acid resin loaded with cations whose corresponding bases are stronger than hydroxylamine or through a bed of a basic resin loaded with anions of strong acids, and is followed by a water wash, an effluent cut containing the salts is obtained first and is followed by a cut containing essentially pure hydroxylamine. Ion exchange resins suitable for the process of this invention are the strongly ionic resins of the cation exchange or anion exchange type. Strongly ionic cation exchange resins have as ionizable functions sulfonate groups, whereas strongly ionic anion exchange resins have as ionizable functions quaternary ammonium groups.

The cations or anions loaded on the resin will be in equilibrium with the cations or anions present in the hydroxylamine containing solution which is passed through the resin. Therefore in a cyclic process the resin will be loaded with these cations or anions after the first cycle. For example, in separating hydroxylamine from an aqueous solution containing ammonium sulfate, a sulfonic acid resin is used substantially in the ammonium form and a quaternary ammonium resin is used substantially in the sulfate form.

Similarly an anion exchange resin can be employed in the present invention, which is loaded with anions whose corresponding acids have acid dissociation constants substantially greater than $10^{-6}$ e.g., chloride and sulfate ion. The first effluent cut from such a resin contains primarily salts and this cut is followed by a cut containing essentially pure hydroxylamine. In such an anion exchange resin, the anions loaded on the resin will be in equilibrium with the anions in the hydroxylamine-containing solution which is passed through the resin, and compensating cations will remain in solution. As explained below, the electrically uncharged hydroxylamine diffuses into the resin and its passage through the resin bed is therefore delayed.

For the isolation of hydroxylamine by ion exclusion, advantage is taken of the weakness, as a base, of hydroxylamine. Hydroxylamine has a base dissociation constant of about $1 \times 10^{-8}$ at ambient temperature. At pH below about 4, such as exists in the technical mixtures resulting from the Raschig process, hydroxylamine is fully converted to hydroxylammonium ion. Such a solution can be converted to a solution containing electrically uncharged hydroxylamine by the addition of basic materials. Useful basic materials include $NH_3$, $NH_4OH_{aq}$, ammonium carbonate, alkali hydroxides such as lithium hydroxide, sodium hydroxide, potassium hydroxide; and alkali carbonates such as lithium carbonate, sodium carbonate, potassium carbonate and their mixtures. Suitable solutions useful in the present invention have a pH of between about 6 and 11 and preferably between about 7 and 9. It appears that when such solutions are passed through a column of a strongly ionized ion exchange resin, ion exclusion effects are manifested. For example, we have observed that when using a typical strong acid cation exchange resin the ions present in the solution appear after about 0.3 bed volume of effluent has been collected relative to the moment that the solution is introduced to a sulfonate resin column. (A bed volume is the geometric volume occupied by a resin bed or column.) On the other hand, the hydroxylamine first appears in the effluent after about 0.7 bed volume of effluent has been collected from the moment that the solution is introduced to the resin column. The net effect is that the ion containing effluent is effectively separated from the hydroxylamine containing effluent.

These effects can be explained as follows. A resin bed contains three distinct volume elements:

(a) The geometric bed volume, which is defined as 1.0 bed volume.

(b) The free volume which is the volume of water between the resin beads and is equal to about 0.3 bed volume.

(c) The gel volume, which is the volume of water contained in the gel structure of the resin beads and in such resin is equal to about 0.4 bed volume.

Ionic species are excluded from the gel volume of the resin by the Donnan exclusion phenomenon as described in "Ion Exchange" by F. Helfferich, McGraw Hill, New York, 1962, pp. 125-151, 431-434. As a result the dead volume available to ions is only the free volume of the resin, i.e. 0.3 bed volume. (The dead volume of a species in an effluent solution is the volume of effluent that must be displaced from the resin bed before obtaining the species in the effluent). Hydroxylamine, however, being a neutral molecule has ready access to the gel volume as well as the free volume, i.e. the resin has an apparent dead volume for hydroxylamine equal to about 0.7 bed volume. Ionic species present in solution do not enter the gel volume of the ion exchange resin, therefore the nature of said ions is not of critical importance to the process of the present invention.

On the other hand, non-ionic species will generally enter the gel volume of the resin and, therefore, will not separate from hydroxylamine. For the purposes of the process of the present invention, non-ionic species include weak electrolytes, e.g. bases with base dissociation constant less than $10^{-7}$ and acids with dissociation constant less than $10^{-7}$.

The maximum amount of hydroxylamine containing solution that can be theoretically separated by the process of the present invention is equal to the gel volume of the ion exchange resin column used, i.e. about 0.4 bed volume. The concentration and mole fraction of hydroxylamine are not theoretically important, however, for practical purposes it is desirable to have hydroxylamine concentration greater than 0.1 molar and mole fraction greater than 0.05.

In effecting separation of hydroxylamine from a solution by the process of the present invention, it is important to allow for a substantial equilibration of said solution with the ion exchange resin. The time of contact between the resin and the solution must be sufficient to allow substantial diffusion of hydroxylamine into the gel volume. The length of contact time can be adjusted by adjusting the flow rate through a given bed of resin.

The process of the present invention can be practiced at any temperature between the freezing point and the boiling point of the solutions used. A preferred range is between about 25° C. and 80° C. and more preferred is a range between about 35° C. and 65° C.

The application of this invention is further described for a preferred embodiment of the process, i.e. the isolation of hydroxylamine from a mixture of hydroxylammonium and ammonium sulfates which simulates solutions obtained by the Raschig process.

These following examples are given for illustrative purposes and to set forth the best mode contemplated by us of carrying out our invention and are not to be construed as limiting the scope of the invention.

EXAMPLE 1

A sulfonic acid resin, Amberlite IR-124 (trade mark of Rohm and Haas Corp.) was placed in a cylindrical glass tube of 1.5 cm inner diameter to a depth of 186 cm. The tube was jacketed and could be heated or cooled at will by means of circulating water. The volume of the resin was 328 ml and the total exchange capacity was 715 mequiv. The resin was transformed to the ammonium form by passing one liter of aqueous 1M ammonia and then was washed with water.

An aqueous solution was made by dissolving 319 mequiv of ammonium sulfate, 80 mequiv of hydroxylammonium sulfate and 72 mequiv of ammonia to a total volume of 51 ml. This solution was passed at 50° C. through the resin at the rate of 7.0-7.5 ml/min and was followed by 427 ml of water. The following cuts were collected:

| Cut | Volume ml. | $NH_3 + NH_4^{30}$ | $NH_2OH + NH_3OH^+$ Mequiv. | $SO_4^=$ |
|---|---|---|---|---|
| 1 | 99 | 0 | 0 | 0 |
| 2 | 169 | 390 | 35 | 398 |
| 3 | 110 | 1.3 | 38 | 0.6 |

| Cut | Volume ml. | $NH_3 + NH_4^{30}$ | $NH_2OH + NH_3OH^+$ Mequiv. | $SO_4^=$ |
|---|---|---|---|---|
| 4 | 100 | 0.3 | 7 | 0.1 |

It is seen that cut #3 contained 47.5% of the total hydroxylamine fed to the resin, at a concentration of 0.77N and in a purity of 97 mole percent.

EXAMPLE 2

A quaternary ammonium resin, Amberlite IRA-900 (trademark of Rohm and Haas Corp.) was placed in a cylindrical glass tube of 1.5 cm inner diameter to a depth of 211 cm (volume = 373 ml). The tube was jacketed and could be heated or cooled at will by means of circulating water. The resin was transformed to the sulfate form by passing 300 ml. 4M aqueous ammonium sulfate and then was washed with water.

An aqueous solution was made by dissolving 319 mequiv. of ammonium sulfate, 80 mequiv. of hydroxylamine sulfate and 72 mequiv. of ammonia to a total of 51 ml. This solution was passed at 50° C. through the resin at the rate of 7.0–7.5 ml/min. and was followed by 349 ml. of water. The following cuts were collected:

| Cut | Volume (ml) | $NH_3^+ + NH_4^+$ | $NH_2OH + NH_3OH^+$ | $SO_4^=$ |
|---|---|---|---|---|
| 1 | 128 | — | — | — |
| 2 | 212 | 381 | 67 | 389 |
| 3 | 40 | 6.8 | 15 | 8.2 |
| 4 | 20 | 0.2 | 1.8 | 0.4 |

It is seen that cut #3 contained 19% of the total hydroxylamine fed to the resin, at a concentration of 0.38N and in a purity of 69 mole %.

We claim:

1. A process for separating hydroxylamine from aqueous solutions containing hydroxylammonium salts in mixture with salts of cations whose corresponding bases have base dissociation constants of at least $10^{-7}$ comprising:
   (a) bringing such solution to a pH of between about 6 and 11;
   (b) sequentially passing the resulting solution and water through a cation exchange resin bed loaded with charge compensating cations which will compose a base having, in aqueous solution a base dissociation constant substantially greater than that for hydroxylamine ($K_b = 10^{-8}$) or through an anion exchange resin bed loaded with charge compensating anions, which will compose an acid having in aqueous solution an acid dissociation constant substantially greater than that for hydroxylammonium ion ($K_a = 10^{-6}$);
   (c) removing from the bed a first effluent containing predominantly cations eluted from such cation exchange resin bed or anions eluted from such anion exchange bed and a later effluent containing predominantly hydroxylamine thereby separating the hydroxylamine from the aforesaid salts.

2. The process as set forth in claim 1 wherein the ion exchange resin bed comprises a cation exchange resin.

3. The process as set forth in claim 2 wherein the ion exchange resin bed comprises a sulfonic acid cation exchange resin.

4. The process as set forth in claim 2 wherein the compensating ions are predominantly monovalent cations.

5. The process as set forth in claim 2 wherein the ion exchange resin is initially in the ammonium form.

6. The process as set forth in claim 1 wherein the ion exchange resin bed comprises an anion exchange resin.

7. The process as set forth in claim 6 wherein the anion exchange resin is a quaternary ammonium resin.

8. The process as set forth in claim 6 wherein the anion exchange resin is initially in the sulfate form.

9. The process as set forth in claim 1 wherein the aqueous solution contains about $10^{-4}$ or more mole/liter of hydroxylamine.

10. The process as set forth in claim 1 wherein the aqueous solutions containing hydroxylammonium salts are in mixture with essentially ammonium sulfate and sulfuric acid.

11. A process as set forth in claim 10 wherein the solution temperature is between about 35° C. and 65° C.

12. The process as set forth in claim 1 wherein the aqueous solution is brought to a pH of between about 6 and 11 by addition of a monovalent amine or hydroxide base.

13. The process as set forth in claim 12 wherein the monovalent amine or hydroxide base is ammonia.

14. The process as set forth in claim 12 wherein a first effluent fraction is substantially depleted of hydroxylamine and a second effluent fraction contains essentially pure hydroxylamine.

15. The process as set forth in claim 1 wherein the aqueous solution containing hydroxylamine salts has been mixed with monovalent amine or hydroxide base having a dissociation constant of at least $10^{-7}$ in amount sufficient to convert a substantial portion of hydroxylammonium ions to hydroxylamine.

16. The process as set forth in claim 15 wherein the cations originally present on said cation exchange resin are essentially the same as in the aqueous solution containing hydroxylammonium salts.

17. The process as set forth in claim 1 wherein the anions originally present on said anion exchange resins are essentially the same as in the aqueous solution containing hydroxylammonium salts.

18. The process as set forth in claim 1 wherein the solution temperature is between about room temperature and 80° C.

19. A process as set forth in claim 1 wherein the solution is brought to a pH of between about 7 and 9.

20. A process as set forth in claim 1 wherein the ion exchange resin is a strongly dissociating acid or base.

* * * * *